Oct. 23, 1956  F. R. RUSSELL ET AL  2,767,847
APPARATUS FOR SETTLING PARTICLES FROM FLUIDS
Filed Oct. 26, 1951  2 Sheets-Sheet 2
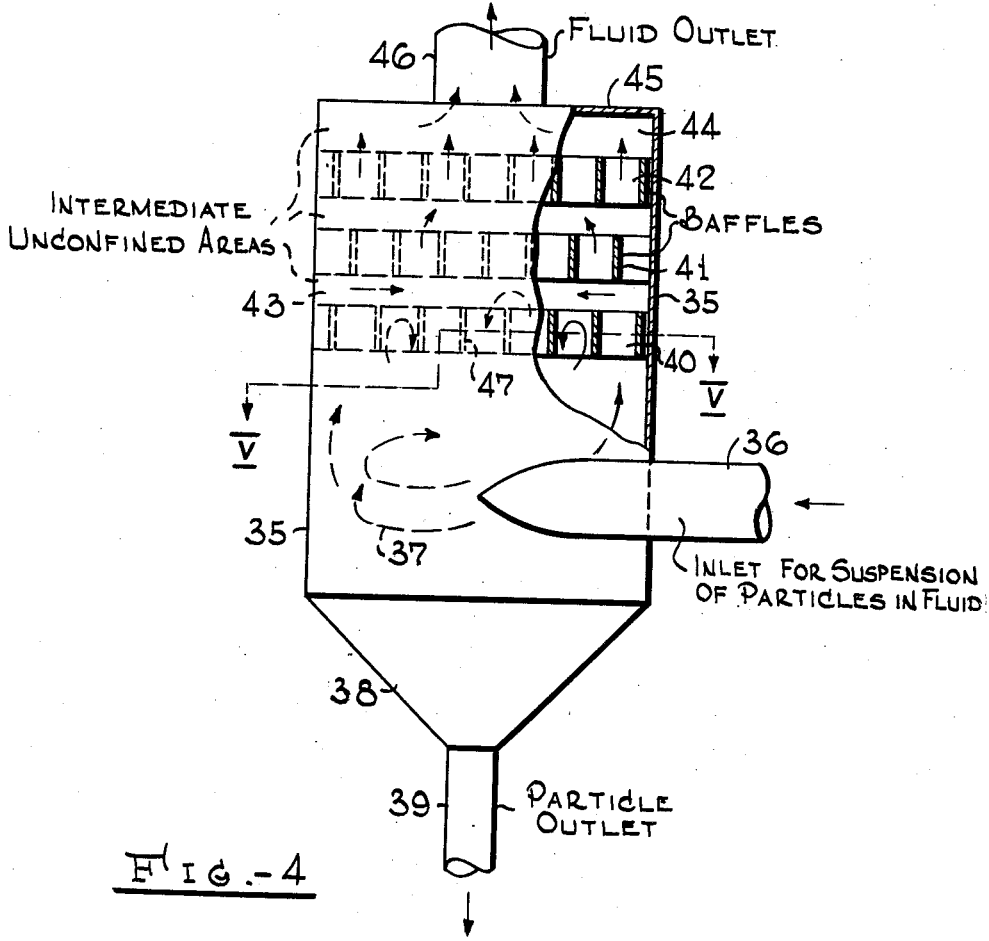
Francis R. Russell
William K. Fell
Robert H. Mueller  Inventors United States Patent Office 2,767,847
Patented Oct. 23, 1956

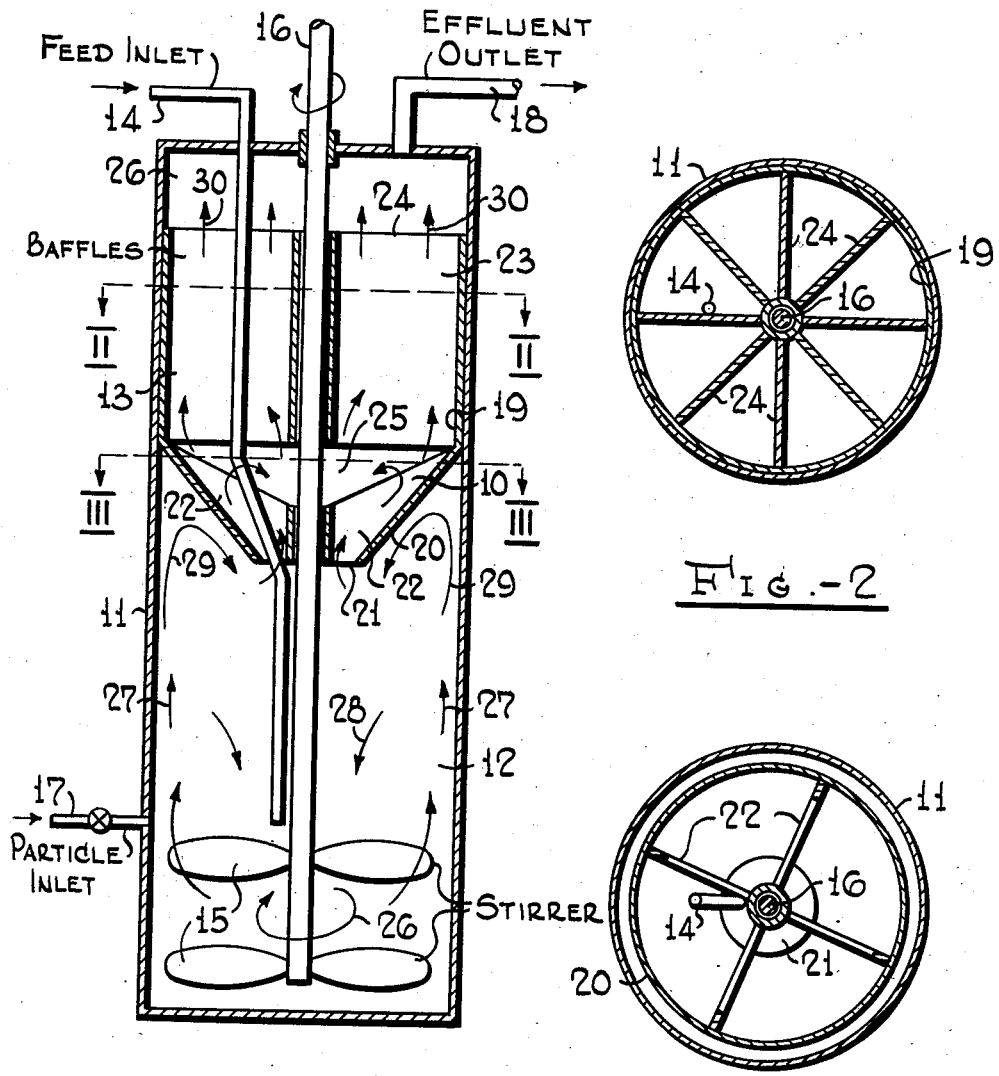

2,767,847

APPARATUS FOR SETTLING PARTICLES FROM FLUIDS

Francis R. Russell, Mountainside, William K. Fell, Scotch Plains, and Robert H. Mueller, North Plainfield, N. J., assignors to Esso Research and Engineering Company, a corporation of Delaware Application October 26, 1951, Serial No. 253,318

3 Claims. (Cl. 210—51)

This invention relates to apparatus for separating discrete particles from fluids in which the particles are suspended. More particularly, it concerns settling of such particles from fluids that are in turbulent, swirling motion.

The separation of solid and liquid particles from some fluids is essential in many parts. Such separations are required for example in catalytic processes in which finely divided, suspended catalysts are contacted with a fluid phase during a catalysis step following which the catalyst must be removed. Conventional settling or separation devices are quite satisfactory for most operations but have been found to be entirely unsatisfactory for separations from a fluid phase that is in turbulent, circulating motion.

The settling of particles is dependent upon the particle size, as well as the density differential with respect to, and the viscosity, velocity, and turbulence of, the fluid in which they are suspended. A dispersed particle for example will settle only if its terminal velocity is greater than the upward component of velocity in the continuous fluid phase. These relations are usually governed by Stoke's law for freely falling particles, particularly when the particle concentration is low. Upwardly flowing streams which are in turbulent, swirling motion generated by mechanical agitators, jets and the like have an extremely non-uniform velocity profile across a given horizontal section. Efficient settling of particles will not be realized if the velocity of the stream is non-uniform, i. e., if some portions of the stream have an upward component of velocity greatly exceeding the terminal velocity of particles to be settled while other portions of the stream are below this desired velocity. Conventional baffled settlers are not suitable for overcoming these difficulties. It is therefore the chief object of the present invention to provide an improved design for baffled settlers and a method for using such settlers whereby the above difficulties are minimized or substantially eliminated.

In accordance with the present invention, an improved baffled settling apparatus is provided whereby it is possible to attain a uniform velocity profile in the upflowing stream, permitting uniform and efficient settling of the particles from the stream. The invention also contemplates a method for shielding the settling zone from abnormal vertical fluid flow at the periphery or outer portions of the upflowing stream such as might be caused by radial flow of fluid from a rotating device; proper baffling and shielding are also provided to minimize swirl (rotational movement of the liquid) in the settling zone and any abnormal vertical flow generated from such swirl.

In one aspect of the present invention, the upflowing medium comprising fluid and suspended particles, which is in turbulent, circulating motion, is passed into a baffled settling zone so constructed and arranged that the medium may be alternately divided into a plurality of confined vertical streams of relatively small horizontal cross-sectional area and recombined into a single stream. The medium is preferably alternately divided and recombined at least twice in order to obtain uniform velocity.

In another aspect of the invention, applicable especially to systems where the fluid is subject to centrifugal forces, a baffling arrangement is provided whereby the fluid is withdrawn from only the central portion of the medium and is passed upwardly into the settling zone. The settling zone is thus shielded from vertical fluid flow due to centrifugal pressure on the outer edges of the flowing stream. The withdrawn portion is divided into a plurality of streams of relatively small cross-sectional area and recombined into a single, relatively non-turbulent stream at least once. Improved settling is thus obtained in the shielded settling zone.

In a preferred modification of the present invention, the central portion of a swirling fluid containing suspended particles is passed into a shielded baffled zone and alternately divided and recombined as heretofore described at least twice. Substantially no turbulence or circulation exists in the upper portion of this settling zone thus permitting efficient settling of the particles.

An important aspect of this invention lies in the use of a settling apparatus having a total of one lower and at least one upper, superimposed baffled zones. Each baffled zone comprises a plurality of vertical baffles such that each zone defines a plurality of substantially vertical paths of relatively small cross-sectional area. Adjacent baffled zones are separated from one another by intermediate, transversely unbaffled areas defined by the walls of the settling zone. Intermediate the top of the uppermost baffled zone and the top of the apparatus there is also provided an unbaffled area. This construction permits alternately dividing and recombining the upflowing stream as heretofore described. The baffled areas reduce swirl and tend to eliminate centrifugal forces within the divided, confined streams. The intermediate, unbaffled areas permit some transverse flow of recombined fluid thereby minimizing transverse pressure differentials existing from the center to the outer area of flow. This alternate dividing and recombining of streams in the settling zone eventually produces a uniformly flowing stream as heretofore mentioned.

The practice of the present invention will be clearly understood from the following description taken in conjunction with the attached drawings in which:

Figure 1 is an elevational view in section of a contacting zone and attendant settling zone constructed in accordance with the present invention;

Figure 2 is a sectional plan view taken on the line II—II of Figure 1;

Figure 3 is a sectional plan view taken on the line III—III of Figure 1;

Figure 4 is an elevational view of an apparatus, partly in section, presenting another modification of the present invention; and Figure 5 is a sectional plan view taken on the line V—V of Figure 4.

Referring now to Figures 1 through 3, and more specifically to Figure 1, the numeral 11 designates an elongated vertical housing within which is positioned an inverted frusto-conical partition 20 defining within the housing a lower contacting zone 12 and an upper settling zone 13. The partition 20 has a centrally disposed inlet or opening 21 at its bottom end. For convenience of construction, partition 20 is supported by a cylindrical member 19 that fits within housing 11. It is assumed for purposes of illustration only that this apparatus is being employed in the slurry polymerization of normally gaseous olefins employing a solid phosphoric acid catalyst. Obviously, it may be applied to analogous processes. The catalyst, which may be phosphoric acid deposited on kieselguhr, silica gel or the like, has a size in the range of about 20 to 200 mesh and is maintained in contacting zone 12. Olefin feed is introduced into zone 12 through line 14. Temperature and pressure conditions in the zone are, respectively, in the range of about 350°–600° F. and 450–1200 p. s. i. g. The catalyst is maintained in suspension or slurried condition by means of an agitating device such as propellers 15 rotated through shaft 16 by a prime moving means, not shown. Fresh catalyst may be introduced continuously or periodically in the form of a slurry in hydrocarbons or the like through line 17.

A fluid comprising unreacted olefins, polymer and suspended catalyst is withdrawn continuously from zone 12, passed upwardly through settling zone 13 and then through effluent outlet 18. Suspended catalyst is settled from the fluid in zone 13 and continuously passed back into zone 12. As the reaction proceeds, catalyst will gradually be disintegrated by attrition into particles having small sizes such as below about 325 mesh.

Settling zone 13 includes cylindrical support member 19, and frusto-conical partition 20, the latter containing a first baffled zone 10. The inlet 21 at the lower end of the frusto-conical partition has an area smaller than the cross-sectional area of cylindrical support 19. Disposed within partition 20 are four vertical baffles or vanes 22 placed at 90° angles with respect to one another and radially extending from the central vertical axis of the frusto-conical section to the walls thereof.

Superimposed above zone 10 and disposed in cylindrical member 19 is a second baffled zone 23 comprising eight vertical vanes 24 radially extending from the axial center outwardly at 45° angles with respect to one another. Vanes in the first lower baffled zone are angularly staggered with respect to the vanes in the second baffled zone, each lower vane 22 in effect bisecting the angle made by two upper adjacent vanes 24.

Each of vanes 22 has a top edge sloping upwardly from the center to the top edge frusto-conical partition 20 creating an angle with respect to the vertical. This results in the formation of a transversely unbaffled area 25 confined by walls of housing 20 and defined by the top of the first baffled zone and the bottom of the second baffled zone. The top of second baffled zone 23 and the top of housing 11 likewise define a transversely unbaffled area 26.

Stirrer 15 agitates the slurry, causing turbulent motion within zone 12, the fluid circulating or swirling generally in the direction 26 of rotation of the agitating means. The violent agitation results in a centrifugal force against the walls of housing 11 resulting in a high upward vertical velocity of fluid in the direction of arrows 27 adjacent the walls thereof. On the other hand the swirling fluid has a downward component of velocity near the central portion of the fluid and it flows in the general direction indicated at arrow 28. Frusto-conical partition 20 acts as a shielding baffle for the up-flowing outer fluid and causes it to be directed, near the center of the zone, in the general direction of arrows 29.

Slurry is withdrawn from a central portion (along a horizontal cross-section of the swirling mass) and passes through opening 21. It is then divided into a plurality of confined, vertical streams of relatively small cross-sectional area in passing up through lower baffled zone 10. The swirling motion of the fluid is decreased somewhat in this zone; however, the impact of the swirl on each baffle extends up through this section. The confined streams are then recombined into a single stream in unbaffled area 25 wherein some transverse flow across the entire horizontal cross-sectional area is permitted, thereby decreasing turbulence. This recombining of the confined streams tends to equalize transverse pressure differentials before fluid flows into the second baffled zone 23.

The upflowing stream is then re-divided into a plurality of confined streams in zone 23 wherein any remaining swirl is substantially eliminated. The streams are then recombined in unbaffled zone 26 at which point the stream has a substantially flat velocity profile in the direction of arrows 30 across the entire horizontal cross-section.

The larger catalyst particles introduced into the lower baffled zone 10 will tend to settle back through opening 21 into the reaction zone; smaller particles, however, will be carried by swirling and turbulence upwardly through the second baffled zone 23 and will settle uniformly only after a substantially flat velocity profile has been realized near the top of zone 23 and in open zone 26. All particles that have terminal velocities greater than the uniform upward velocity of the fluid will settle in zone 26. Particles having smaller terminal velocities will of course be entrained along with the hydrocarbon through outlet 18.

Although the velocity of fluid flowing upwardly through opening 21 is greater than the velocity in the upper portion of the settler, the minimum particle size capable of entraining through the settler will be governed by the area of the upper settling portion 23 rather than by the area of opening 21. Particles settling in the upper portion of the settler will be returned back to the frusto-conical portion where they will build up in concentration to the "hindered settling" condition. Then even the finest particles will slide back into reaction zone 12 through opening 21 at the bottom of the conical portion. It is required, of course, that the angle of the conical wall 20 be such that the settled material will readily slide back into the reaction zone. The acute angle will generally be more than 30° with respect to the horizontal and usually need not be more than about 60° so that adequate shielding area is available to prevent wall effects as heretofore mentioned.

Turning now to Figures 4 and 5, the numeral 35 designates a more or less conventional cyclone separator having an inlet 36 to its periphery through which a fluid comprising suspended particles is passed at extremely high velocities. The fluid on entering separator 35 is subjected to a swirling action in the general direction of arrows 37 causing larger particles to impinge against the walls and to slide down through conical portion 38 and outlet 39.

Disposed within the upper portion of separator 35 and above inlet 36 are three baffled zones 40, 41, and 42. Each of these zones comprises two series of a plurality of parallel, vertical baffles 47, the two series being placed at right angles to each other to provide the "egg-crate" structure zone. Thus each baffled zone provides a plurality of confined, substantially vertical channels of relatively small cross-sectional area (as compared with the cross-sectional area of the separator).

Adjacent baffled zones are separated by intermediate, unconfined areas 43; unconfined transverse area 44 is likewise provided above zone 42 and below the top 45 of the separator. Outlet 46 for fluid is provided above baffled zone 42.

Larger particles suspended in the fluid will settle from the turbulent swirling mass on contacting the lower walls of zone 35. However, the upwardly flowing fluid passing through the baffled portions will contain smaller particles which normally would be entrained with the fluid passing through outlet 46. In accordance with the present invention, the fluid is alternately divided into a plurality of confined vertical paths and recombined into a single stream a total of three times in the baffled zones. Turbulence, swirling and transverse pressure differentials are reduced at each stage and are gradually eliminated as the fluid passes through the successive dividing and recombining stages mentioned. The fluid therefore has a substantially uniform velocity profile in the upper portion of zone 42 and in unconfined portion 44 whereby particles having terminal velocities substantially equal to the uniform upward velocity of the fluid will settle back into the lower portions of the zone. Eventually, the concentration of the smaller particles will build up to the desired hindered settling condition and will pass through outlet 39.

For the purposes of the present invention the term "suspended particles" will refer to discrete, finely divided solid or liquid particles that may be in the form of finely divided solids, catalysts, dusts, metals, liquid droplets, mists and the like. Such particles should be of non-colloidal nature and should be capable of being suspended and settled from a continuous fluid phase. The fluids may comprise liquids, gases, vapors, fluids in a single phase at a pressure above the critical for the particular fluid involved, and the like. The particles of course should not be miscible with or soluble in the continuous fluid phase. Liquid droplets, for example, should be suspended in an immiscible liquid or gas.

The process may be a catalytic process as heretofore mentioned in which solid or liquid catalyst particles are contacted with a fluid phase to obtain a desired catalytic conversion, the fluid phase being agitated or subjected to turbulent, swirling action by mechanical agitators, centrifugal means, jets and the like. The settler may also be useful in cases where a solid absorbent is contacted with hydrocarbons or other organic materials to obtain selective adsorption of one or more components. The improved settling device is particularly applicable to various types of separators wherein it is desired to remove liquid droplets such as acids and the like from a gas or to remove dust particles from air, etc.

The construction of the settling zone may be varied to suit particular needs and types of materials being handled. In addition to the use of vertical vanes and "egg-crate" type baffles, the vertical channels in the individual baffled zones may be defined by vertical tubes in closely nested arrangement permitting flow along the inner or outer tube surfaces or both. A combination of vertical vanes in a lower baffled section and of "egg-crate" construction in an upper portion, or a combination of closely nested tubes with one or both of the other arrangements may likewise be used. Nested tubes such as 50 in Fig. 5 may be used, for example.

The number of vertical channels desired for a given cross-sectional area will depend to a large extent on the turbulence and the type of particles present in the fluid being separated. It is generally desired to subdivide the baffled portion into at least four or more vertical channels. The length of the vertical channels will likewise vary, but as a rule the length/mean diameter (L/D) ratio of each individual cell or channel should be above about one, preferably above two. The distance between adjacent baffled zones, i. e. the depth of the unconfined intermediate area, should be sufficient to permit the combined streams to undergo some transverse as well as vertical flow before entering the superimposed baffled section. Generally the distance between two baffled sections may be less than the length of an individual channel, although it will be realized that particular needs will vary considerably with the material being handled.

It is emphasized that the cross-sectional area of the settling zone should be selected such that the vertical velocity of the fluid in the zone, when uniform, will be insufficient to fluidize or entrain the smallest size particles that it is desired to remove from the fluid maintained in the vessel. The cross-sectional area thus is readily determined by knowing the settling characteristics of the particles in question. For example, in settling solid phosphoric acid catalyst particles having sizes as low as about 3 to 40 microns, the uniform velocity of a dense hydrocarbon phase at a pressure in the range of about 500 to 1000 p. s. i. g. should be in the range of about 0.01 to 0.5 ft. per minute.

The invention will be further described in connection with the following examples although it is to be understood that these examples are not to be construed as limiting the invention in any way.

*Example I*

An apparatus similar to that shown in Figure 1, constructed of Lucite, was provided with a mechanical agitator and various types of superimposed settling zones. Observations were made on flow and settling characteristics in each type of settling zone used. Runs were carried out on feeds comprising $C_3$—$C_4$ olefins employing about 20 to 100 mesh solid phosphoric acid catalysts comprising phosphoric acid deposited on silica gel.

In a first run, a single 8-vane settling zone (similar to zone 23 of Fig. 1) was used; the length/mean diameter ratio of each cell between vanes was about 2. No lower shielding baffle was provided. When agitating the contents of the reaction zone with an agitator operating at a high speed, the 8-vaned baffled zone alone was ineffective in preventing entrainment of catalyst with the reactor effluent. It was noted that swirl impinged on the vanes and created a circulation within each cell. Transverse pressure differentials from the center to the outside of the flowing stream caused additional circulation.

Each of the 8 cells were then filled with small vertical tubes in order to obtain an L/D ratio in each channel of about 12. Circulation within each cell due to swirl impact on the lower tube surfaces was decreased but circulation due to transverse pressure differentials from centrifugal effects was still evident and entrainment of catalyst particles could not be prevented.

*Example II*

The settler employed in Example I was modified by installing a bottom section in the shape of an inverted frustrum of a cone having a central inlet. The partial conical portion was similar to partition 20 of Figure 1. Although the cone decreased centrifugal effects in the settling zone since flow was withdrawn only from the central portion of the fluid, swirl still extended upwardly into the baffled area, giving transverse pressure differentials and resulting in circulation upwardly therethrough.

*Example III*

The settling apparatus of Example II was next modified so that an open zone was placed between an upper and a lower baffled zone, the open zone corresponding to zone 25 in Fig. 1. It was found that under the same conditions employed in previous runs, turbulence in the lower baffled zone 10 was not great enough to cause substantial circulation or turbulence to extend upwardly through baffled zone 23. The velocity profile across the upper edge of zone 23 was found to be substantially flat and zone 26 was substantially free of solids.

*Example IV*

A 5" diameter slurry polymerization reactor constructed in accordance with that described in Example I (single settling zone) was employed in polymerizing olefins in a $C_3$—$C_4$ feed using 2 pounds of a 20 to 100 mesh catalyst comprising about 80 weight percent $H_3PO_4$ deposited on silica gel. The run was carried out at a temperature of 450° F. and 1000 p. s. i. g. A mechanical stirrer operating at 300 revolutions per minute was used to keep the catalyst slurried in hydrocarbon. A feed rate of about 1.5 gallons/pound of catalyst/hour was used. Under these conditions, as much as 4 grams of catalyst was entrained with reactor effluent for each gallon of hydrocarbon throughput.

*Example V*

A reactor constructed in accordance with that described in Example III was operated under conditions identical to those used in Example IV. Entrainment was reduced to below 0.1 gram catalyst per gallon of throughput or about 1/40th as much as was obtained with the single baffled settling zone.

What is claimed is:

1. An apparatus for contacting and separating a fluid medium and finely divided solids, comprising an elongated vertical housing, an inverted frusto-conical partition, open at its bottom end, positioned within said housing to define therein a lower contacting zone and an upper separating zone, at least two sets of a plurality of substantially vertical vanes disposed within said upper zone and extending radially from the central vertical axis of said housing to the wall thereof, a first set of said vanes being disposed within said frusto-conical partition, remaining sets being spaced above said first set, adjacent sets being spaced from each other, thereby defining between them transversely unbaffled and unobstructed areas, the uppermost set of vanes being spaced below the top of said housing to define therewith a transversely unbaffled and unobstructed area, and an outlet for said housing positioned above the said uppermost set of vanes.

2. An apparatus as defined by claim 1 wherein the vanes in each set are angularly staggered with respect to vanes in adjacent sets.

3. An apparatus for separating a fluid medium and finely divided solids comprising an elongated vertical housing, an inverted frusto-conical partition, having an opening at its bottom end, positioned within said housing, at least two sets of a plurality of substantially vertical vanes disposed within the said housing and extending radially from the central vertical axis of said housing to the wall thereof, a first set of said vanes being disposed within said frusto-conical partition, remaining sets being spaced above said first set, adjacent sets being spaced from each other, thereby defining between them transversely unbaffled and unobstructed areas, the uppermost set of vanes being spaced below the top of said housing to define therewith a transversely unbaffled and unobstructed area, and an outlet for said housing positioned above the said uppermost set of vanes.

References Cited in the file of this patent
UNITED STATES PATENTS

| | | |
|---|---|---|
| 781,406 | Devereux | Jan. 31, 1905 |
| 1,102,696 | Shiner | July 7, 1914 |
| 1,701,068 | Flowers | Feb. 5, 1929 |
| 1,937,190 | Chance | Nov. 28, 1933 |
| 1,963,200 | Hawley | June 19, 1934 |
| 2,000,606 | Othermer | May 7, 1935 |
| 2,054,539 | Gutzeit | Sept. 15, 1936 |
| 2,123,554 | Klosky | July 12, 1938 |
| 2,214,248 | Hawley | Sept. 10, 1940 |
| 2,245,583 | Green | June 17, 1941 |
| 2,254,352 | Cloud et al. | Sept. 2, 1941 |
| 2,453,592 | Putney | Nov. 9, 1948 |
| 2,472,502 | Tyson | June 7, 1949 |
| 2,502,490 | Sweet | Apr. 4, 1950 |
| 2,567,450 | Smith et al. | Sept. 11, 1951 |